Figure 1:
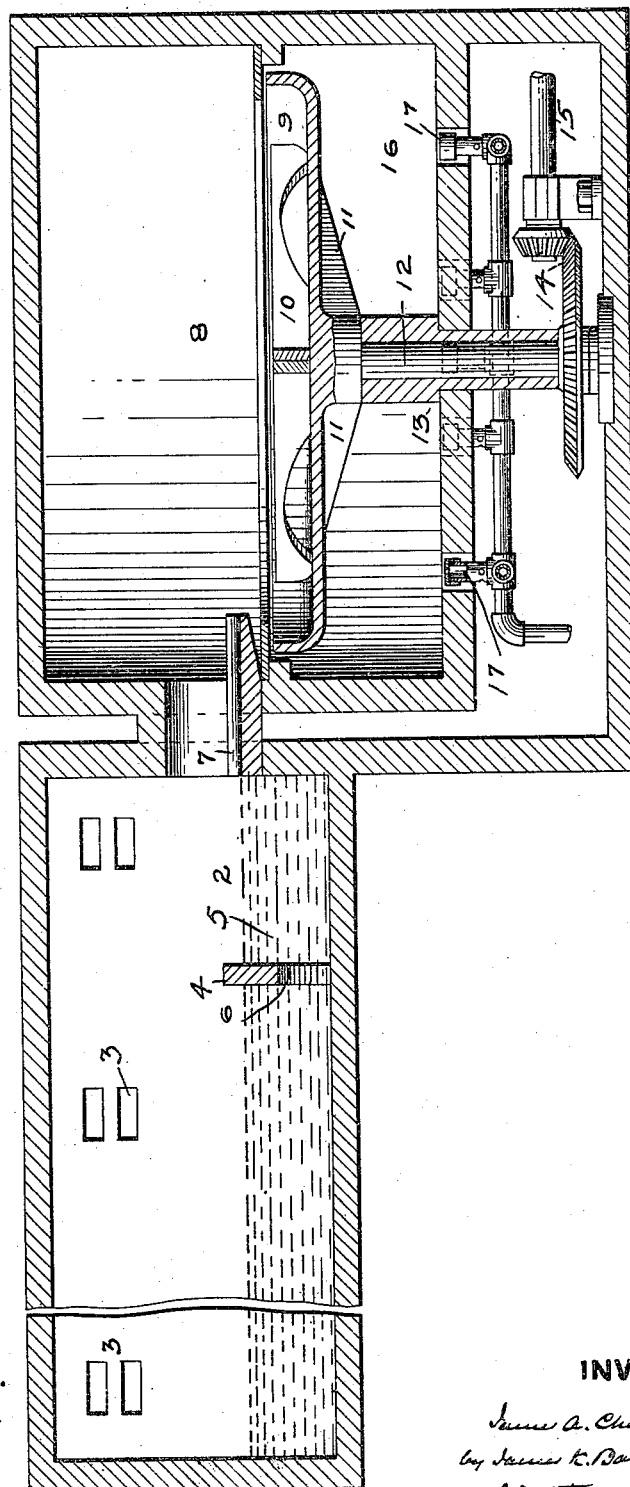

J. A. CHAMBERS.
APPARATUS FOR HANDLING MOLTEN GLASS.
APPLICATION FILED MAR 25, 1907.

950,092.

Patented Feb. 22, 1910.
3 SHEETS—SHEET 1.

WITNESSES.

INVENTOR.

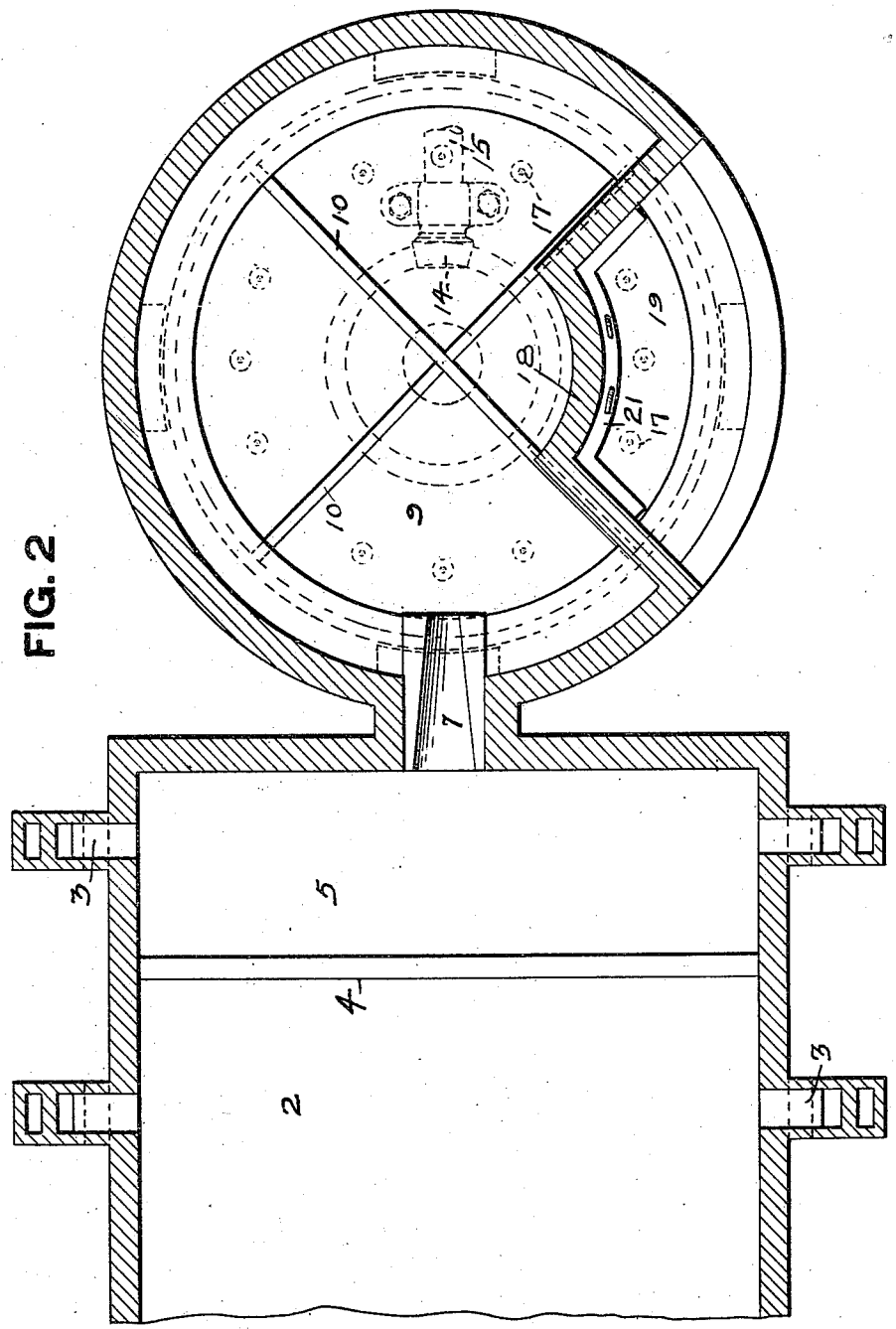

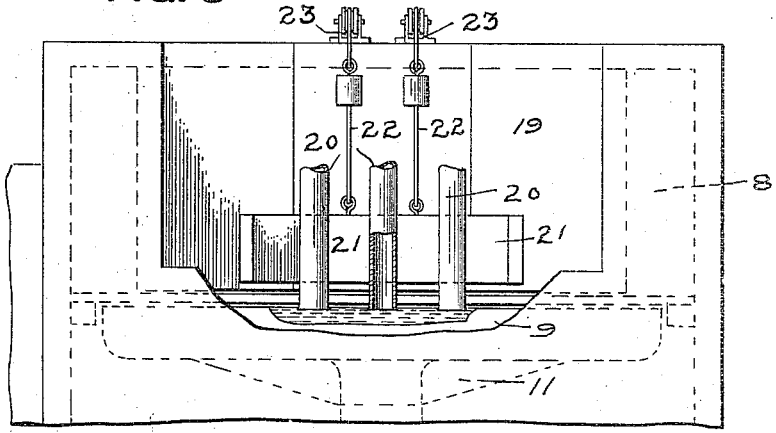
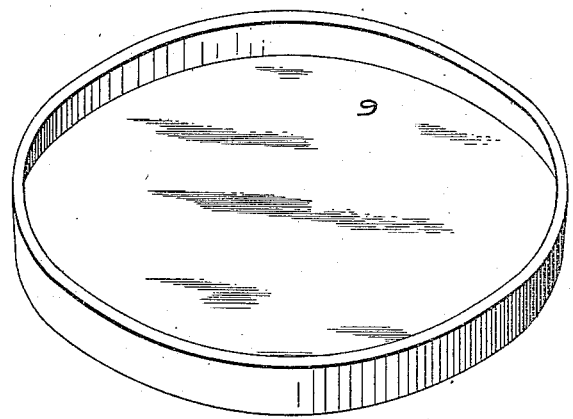

UNITED STATES PATENT OFFICE.

JAMES A. CHAMBERS, OF PITTSBURG, PENNSYLVANIA

APPARATUS FOR HANDLING MOLTEN GLASS.

950,092.

Specification of Letters Patent. Patented Feb. 22, 1910.

Application filed March 25, 1907. Serial No. 364,235.

*To all whom it may concern:*

Be it known that I, JAMES A. CHAMBERS, residing at Pittsburg, in the county of Allegheny and State of Pennsylvania, a citizen of the United States, have invented or discovered a certain new and useful Improvement in Apparatus for Handling Molten Glass, of which improvement the following is a specification.

The invention relates to the handling of molten glass when delivered from a melting furnace or tank into a suitable receptacle, preparatory to its subjection at proper temperature and consistency to any desired shaping operation, and it consists in means for the attainment of such temperature and consistency, and for the maintenance of the same while the glass is being subjected to such shaping operation, as well as the treatment of the glass which may remain in the receptacle, or in that portion of it from which the shaped glass has been withdrawn, after the termination of the shaping operation.

The invention has been found to be particularly well adapted for use in connection with the drawing of glass, either in sheet or hollow form, from a molten body, and in the accompanying drawing I have illustrated one form of apparatus embodying my invention, as I prefer to employ it for this purpose, wherein—

Figure 1 is a longitudinal vertical sectional view of such apparatus arranged in juxtaposition to a glass melting furnace of common form; Fig. 2 is a horizontal sectional view of the same; Fig. 3 is an elevation partly in section, at the drawing point; and Fig. 4 is a perspective view of the receptacle or pan from which the glass is drawn.

In the drawing of glass difficulty has been experienced arising from or by reason of inequalities or variations in temperature of the glass in different pots or receptacles, as well as in different parts of the same receptacle. In the use of the apparatus illustrated these difficulties are obviated, by causing the receptacle into which the glass flows from the melting furnace, or is otherwise charged, to rotate in a heating chamber so as to bring different portions of the receptacle to the charging point; then to bring successive portions of the same to an uninclosed drawing point, and protect the same while at the drawing point from the heat of the chamber; and finally to bring that portion of the receptacle from which the glass has been drawn back into the heating chamber. The effect or result is that a pool of glass is preserved in the receptacle, while that portion of the glass at the drawing point is permitted to chill equally and evenly in all parts as it is drawn, and excessive chilling of any portion of the pool of glass in the receptacle is prevented.

Referring to the drawings, 2 represents the melting tank of the furnace, which may be of the ordinary construction, having heating flues 3, or other suitable heating devices, and a bridge wall 4 which divides the melting chamber 2 from the fining chamber 5, the communicating passage 6 between the chambers 2 and 5 being below the normal level of the molten glass, thus preventing any unmelted floating matter from passing to the fining chamber. Leading from the fining chamber 5 is a spout or trough 7, which extends into the heating chamber 8 to a point directly over the revoluble pan 9. This pan 9 is formed of clay, or other suitable substance, and may be provided with supporting or strengthening braces or wings 10 and 11. It is also revolubly supported on a central spindle 12, which is protected by a fire-brick wall 13, and is rotated by means of bevel gear wheels 14 and power shaft 15, or by other suitable means. Below the pan 9 is the fire-chamber 16 into which gas-burners 17, or other heating devices, open, which burners are designed to heat the bottom of the pan.

Above the pan 9 is the heating chamber 8, which may be heated by any suitable means. As shown in the drawings, the larger portion of the heating chamber 8 is partitioned off by the wall 18, leaving a relatively small drawing space or room 19, which is open at the top to permit the bait or baits 20 being inserted in the glass in the pan and the drawing of cylinders or sheets of glass therefrom. To protect that portion of the glass in the drawing room that is adjacent to the heating chamber 8 from being kept from chilling, and to permit all the glass in the drawing room to chill evenly, I interpose a mantle or shield 21 between the heating chamber 8 and the drawing room 19, one form of which is shown in Figs. 2 and 3 of the drawings. This mantle 21, as shown in Figs. 2 and 3, consists of a fire-clay shield, supported by the rods 22, connected with chains or ropes passing over pulleys 23, by means of which the shield may be lowered down to and below the surface of the molten glass in the pan 9, thus effectually cutting off the heat in the heating chamber 8 from passing beneath the partition wall 18 and affecting the surface of the glass in that part of the pan 9 which is situate in the drawing-room 19.

The operation of my apparatus as above described, is as follows: The glass is melted and fined in the furnace 2 and flows, or is caused to flow, through the chamber 5 and the trough 7 into the pan 9 in the heating chamber 8, where it spreads out and fills every vacant part in this pan. After the pan 9 has received the desired quantity of molten glass, that is, after the glass has risen to a certain height in the pan, the pan is given a quarter rotation, which brings a fresh portion of glass into the drawing room 19, and one or more cylinders may be drawn from the molten glass in that portion of the pan 9 that is in the drawing room 19 before the pan is rotated, depending entirely upon the amount of chill which has been imparted to the glass in the drawing room 19 during the filling of the pan. That portion of the glass in the drawing room 19 being in contact with the air, soon chills sufficiently on its surface to permit the drawing of the cylinders, which are drawn by means of the baits 20 in the usual manner. After the drawing operation, the pan is given a quarter rotation, which brings that part of the pan from which the glass has been drawn back into the heating chamber 8, and also brings a fresh portion of the pan into the drawing room. By this means the glass in that portion of the pan 9 in the heating chamber 8 is kept in a molten condition at an even temperature, and that portion of the glass which is in the drawing-room 19 is permitted to chill slightly but evenly on the surface.

The advantages of my invention are that there is no material hardening of the glass in any part of the pan that would require remelting, and the glass in the drawing room is permitted to chill evenly on the surface, sufficiently to allow the drawing to be successfully accomplished, forming a cylinder or sheet of equal thickness of glass throughout its area, and free from internal strains.

Although I have shown and described a certain form of movable shutter, I do not desire to limit myself thereto, as any suitable form of mechanical device may be employed that will permit the heat from the heating chamber 18 acting on the surface of the glass in the drawing room. Neither is the invention limited to the employment of a circular rotating receptacle, since receptacles of other forms, having other movements, may be employed.

I claim as my invention:

1. In apparatus for handling molten glass, the combination with a movable receptacle, of a heating chamber inclosing a portion of said receptacle, a drawing room inclosing the remaining portion of said receptacle and having an open top to permit the drawing of glass sheets and being separated from the heating chamber by a wall overhanging the receptacle, means for moving the receptacle so that successive portions thereof may be moved from the heating chamber to the drawing room, and movable means shaped to conform to said wall and arranged to extend below said wall to protect the glass in the drawing room from the heat of said heating chamber.

2. In apparatus for handling molten glass, the combination with a rotatory drawing pan, of a heating chamber inclosing a portion of said receptacle, a drawing room inclosing the remaining portion of said receptacle and having an open top to permit the drawing of glass sheets and being separated from the heating chamber by a wall overhanging the receptacle, means for moving the receptacle so that successive portions thereof may be moved from the heating chamber to the drawing room, and a shield shaped to conform to said wall and arranged to be lowered below the wall and into the pan for separating the portion of the pan within the drawing room from the heating chamber during the drawing operation.

3. In apparatus for handling molten glass, a heating chamber having a reëntrant overhanging wall upon one side thereof forming an open topped drawing room, a receptacle arranged to rotate within the heating chamber and under said overhanging wall, and a vertically movable shield or shutter shaped to conform to the overhanging wall and coöperating therewith in lowered position to completely separate the drawing room from the heat of the heating chamber.

In testimony whereof, I have hereunto set my hand.

JAMES A. CHAMBERS.

Witnesses:
  M. A. BARTH,
  C. E. EGGERS.